(12) United States Patent
Lamm

(10) Patent No.: US 6,498,450 B2
(45) Date of Patent: Dec. 24, 2002

(54) METHOD OF BRIDGING PARTIAL TIGHTNESS ON MOVABLE MEMBERS

(75) Inventor: Hubert Lamm, Kappelrodeck (DE)

(73) Assignee: Robert Bosch GmbH, Stuttgart (DE)

( * ) Notice: Subject to any disclaimer, the term of this patent is extended or adjusted under 35 U.S.C. 154(b) by 32 days.

(21) Appl. No.: 09/788,951

(22) Filed: Feb. 20, 2001

(65) Prior Publication Data

US 2001/0022504 A1 Sep. 20, 2001

(51) Int. Cl.[7] .............................. H02P 1/00; H02P 3/00
(52) U.S. Cl. ...................... 318/445; 318/461; 318/468; 318/565; 318/282
(58) Field of Search ................................ 318/563, 565, 318/566, 580, 280–282, 445, 447, 461, 466–470

(56) References Cited

U.S. PATENT DOCUMENTS 5,166,586 A * 11/1992 Yaguchi ...................... 318/434
6,064,165 A * 5/2000 Boisvert et al. ............. 318/465
6,347,482 B1 * 2/2002 Takiguchi et al. ........... 318/466

* cited by examiner

Primary Examiner—Marlon T. Fletcher
(74) Attorney, Agent, or Firm—Michael J. Striker

(57) ABSTRACT

A method of bridging partial tightnesses of moveable members received in guides and driven by electric drive motors provides an automatic monitoring function. Within a tightness region, a releasing force is varied in one or several steps. An automatic bridging function is utilized, which corresponds to the rotary speed course, and an automatically operating control operates so that the releasing force is increased only in a limited region of the identified bridging location.

10 Claims, 2 Drawing Sheets

METHOD OF BRIDGING PARTIAL TIGHTNESS ON MOVABLE MEMBERS

BACKGROUND OF THE INVENTION

The present invention relates to a method of monitoring a partial tightness on movable members, such as for example window panes or movable roof. These components of motor vehicles are provided in increased numbers in the electrical drive which are operatable remotely. Tightness occurs when, for example, wind deflectors which are arranged before the movable roofs are subjected to increased air resistance while traveling with increased traveling speed. In these situations an actuation of removable roof occurs.

Manual bridging functions are provided for electrical drives utilized for actuation of window panes or movable roofs, so that the driven displaceable members at the location of a tightness can be moved by hand over the tightness location. A manual engagement of the operator during driving of a vehicle distracts it and can lead to critical traveling situations, in which the driver may not pay undivided attention to the traffic.

In other embodiments of the window panes or movable roofs, reference runs are provided in the movable systems. The reference runs load not insignificantly the electrical drive, since they have a calibration function. Reference runs moreover are time consuming, and during the reference runs not all operations occur, which later during operation of the window panes or movable roofs can occur.

SUMMARY OF THE INVENTION

Accordingly, it is an object of the present invention to provide a method of bridging of partial tightness of movable members, which avoids the disadvantages of the prior art.

In keeping with these objects and with others which will become apparent hereinafter, one feature of present invention resides, briefly stated, in a method of bridging partial tightness of a movable members, in accordance with which an automatic monitoring function is provided, and within a tightness region a releasing force is varied in one or several steps.

With the inventive solution, an automatic bridging function is utilized, which corresponds to the rotary speed course. An automatically operating control operates so that only in the small limited region of the bridging location which is identified as such, the releasing force is increased by a certain amount. When a one-time increase of the releasing force is not sufficient for a certain amount to overcome the tightness location, then it is increased by automatic bridging function in a stepped manner in several starting routines to a maximum value. When with a releasing force below the maximum releasing force, the overcoming of the tightness location is performed, then the releasing force required for overcoming the obstacle is stored in an adaptive storage unit. The maximum value of the releasing force can be preset on the automatic bridging function, so that depending on the application, predetermined maximum releasing forces are provided or can be allowed. Also the step widths at which the reducing force is raised within the starting routine in a stepped manner can be preselected variably for the automatic bridging function.

The stepped increase of the releasing force can be embedded for example in a first run to an obstacle with subsequent reversing of the drive. If the obstacle is located outside of the region in which the tightless location is localized, the drive is reversed. If the tightness location is inside the back window, the releasing force is increased only in the region in which the tightness location is provided. After several starts and runs on the obstacle, a stepped increase of the releasing force in the region of the back window is provided, until the maximum fixed releasing force is achieved.

When the obstacle representing the tightness location is finally overcome without reversing of the electrical drive, the rotary speed adaptation can be adjusted to the changed obstacle. The releasing force which directly overcomes the obstacle or the rotary speed adaptation can be stored in a storage which is associated with the automatic bridging function.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
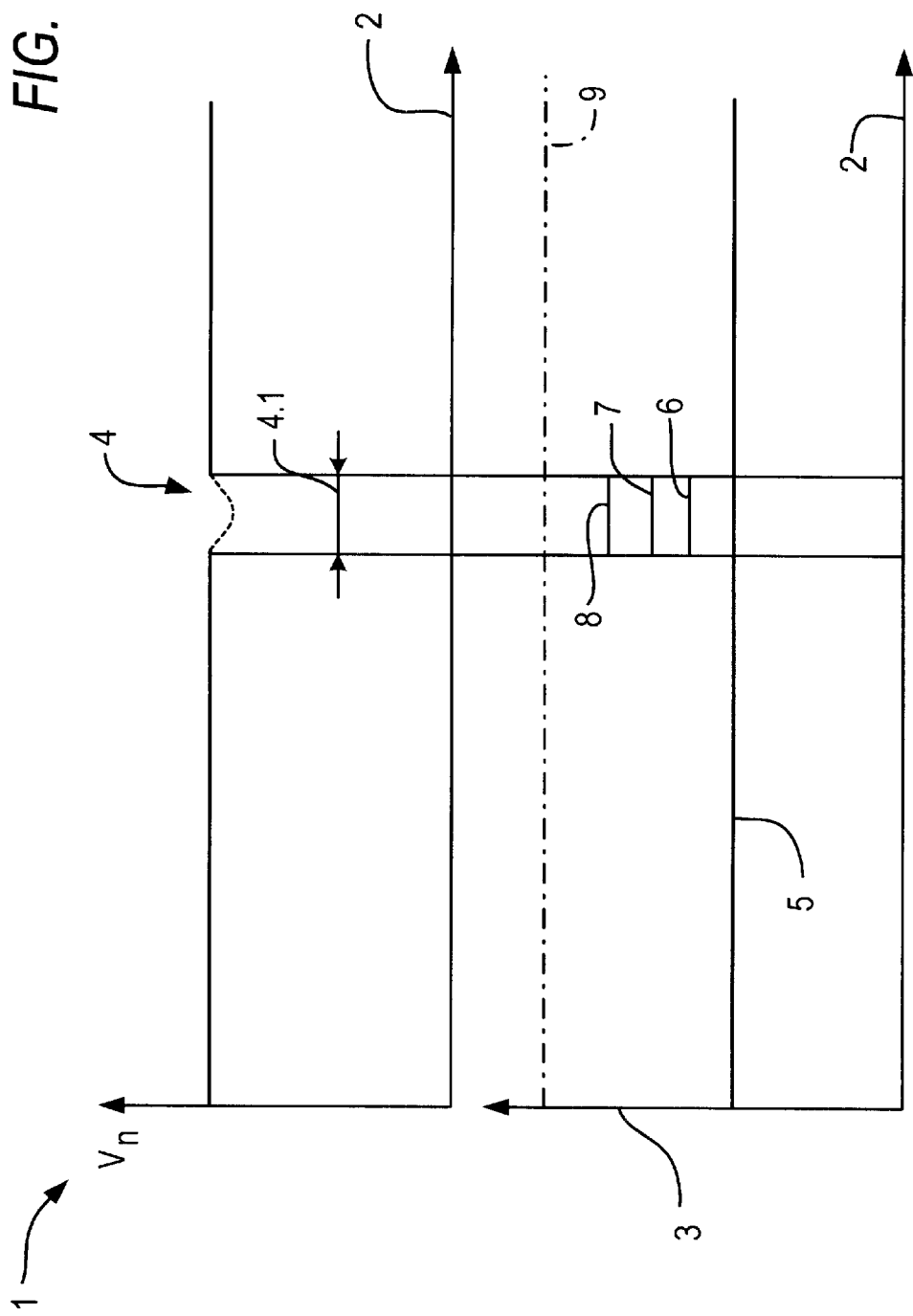
FIG. 1 is a view showing a rotary speed course of an electric drive with a tightness location to be overcome.

FIG. 1 shows a rotary speed course of an electric drive with a tightness location to be overcome.

FIG. 1 shows both the adjusting rotary speed break on the electrical drive, and also the releasing force increase released by the passage of a tightness region 4.1. The rotary speed course 1 over the path 2 is plotted above in FIG. 1 in the rotary speed/path diagram. In the tightness region 4.1 to be overcome a rotary speed break is provided. It extends not on a discrete location of a traveling path 2, but instead over a traveling path region 4.1. With the inventive proposed procedure, the force which is required for overcoming the tightness region 4.1 is increased in stepped fashion, until the driven member to be moved, for example a window pane or a movable roof, smoothly passes the tightness region 4.1 without reversing the electrical drive.

Figure 2:
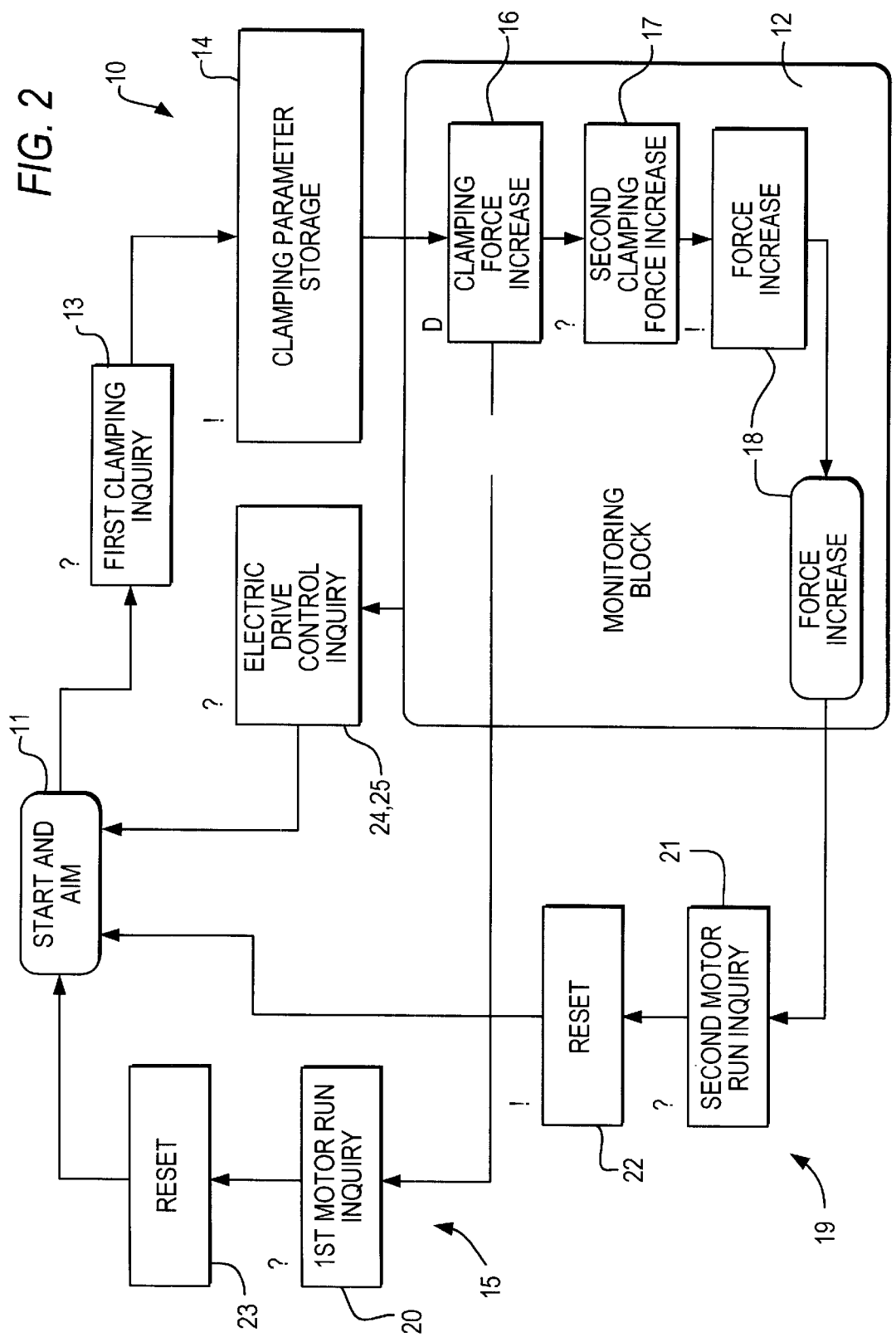
FIG. 2 is a view showing a bridging function as a status automating system.

In the lower region of the diagram of FIG. 1, the releasing force 3 is plotted over the path 2. In the upper diagram of FIG. 1 the tightness region 4.1 is transmitted to the lower diagram. Within the tightness region 4.1 which releases an automatic bridging function, a stepped increase of the releasing force is provided. After this, a new start of the tightness region 4.1 with increased releasing force takes place. The increased releasing force has its limit in the preset maximum permissible value of the releasing force which is predetermined on the automatic bridging function. The maximum value for the releasing force is identified in the lower diagram of FIG. 1 with reference numeral 9. Depending on the predetermined releasing force increase steps, the starting routines 15, 19 shown in FIG. 2 are performed so often, until n required releasing force increase steps are worked off. In an adaptive storage system the predetermined releasing force value 5 can be overwritten by such value for the releasing force, which allows to overcome directly the tightness region 4.1 for the movable member.

The rotary speed of an electric drive can be adapted to a partial tightness, such as for example the one which can occur with wind deflectors on removable roofs. The rotary speed values adapted to the actual conditions can be stored in the storage system.

From the consideration of the bridging function as a condition automated system of FIG. 2, it can be seen that, starting from the start and an aim, or an end point of the processing of the automatic bridging function routine, a first clamping inquiry 13 and performed. When this condition of the movable member is recognized, the position of the region 4.1 is stored, the time limiter is set and the electrical drive is reversed. This is performed by a clamping parameter storage 14, from which the monitoring block 12 which contains in the condition automatic system 10 is branched. There a first clamping force increase 16 is performed, which is transmitted then by the control of the electrical drive in the first starting routine 15 to the movable member. It is monitored whether inside the first run starting routine 15 the course of the electrical drive is ended normally, or the new clamping situation occurs. If the motor running ends normally, the increase of the clamping force which is performed in the position 16 in the monitoring block is again retaken.

When to the contrary, within the first running routine 15 to be performed the running of the electrical drive ends not normally, a new clamping situation occurs. The new clamping situation is verified by an additional inquiry 19 in the monitoring block 12. The second clamping inquiry 13 with a positive result activates a new clamping increase at the position 18, so that now after the resulting processing of the first starting routine 15, the second starting routine 19 can be performed with an increased value for the clamping force to be applied. After the increase of the releasing force and performing of the second starting routine 19, a testing 21 is performed of the condition, whether the electrical drive ends its running normally or it comes again to the clamping situation. Thereafter, the new clamping force increase 18 is taken, before the starting or aiming point 11 is branched.

In addition to the starting routines 15, 19 which can be performed with different releasing forces, the monitoring block 12 monitors whether for example a previously set motor stoppage time of for example 10 seconds is exceeded or not. If it is exceeded, the starting or aiming inquiry point 11 is branched, and the automatic bridging function is set back. A setting back of the automatic bridging function can be performed when during the inquiry 25 of the control of the electrical drive, a rotary speed reverse on the electrical drive occurs. During the occurrence of a rotary direction reverse, the movable member, whether a window pane or a movable roof, is moved back to its open position. Also, in the closed position of the corresponding movable member, the automatic bridging function 10 is set back.

The diagram of FIG. 2 shows a course of the automatic bridging function.

First a first start on an obstacle which produces a tightness is performed. The electrical drive for driving the member to be moved is reversed and the member moves out of the tightness region if the obstacle must lie outside of the tightness region 4.1.

If the obstacle is located in the tightness region 4.1, the electrical drive is reversed. By means of the automatic bridging function, an increase of the releasing force is performed for example as F>100 N. Thereafter a new start of the member to be moved is performed in the tightness region by running of the first starting routine 15. If it comes again to a clamping situation, by running of the second starting routine 19, a second run with a stepped increase of the releasing force is performed, to overcome the obstacle represented by the tightness region 4.1. These starts are performed with a corresponding stepped increase of the releasing force until the stepped increase releasing force assumes the predetermined maximum value of the releasing force 9 (compare FIG. 1). If the obstacle can be finally overcome, the releasing force can be stored and associated with the corresponding path region 4.1 on which the tightness region 4.1 was found. In this way a force threshold adapted to the movement path to be overcome is adjusted for the releasing force, so that the electrical drive which drives the member to be moved is adapted to the tightness region 4.1 in the sense of the rotary speed and the releasing force. The path portion 2 to be covered is driven with a predetermined releasing force 5, and during detection of the previously stored tightness region 4.1 the electrical drive is operated with a stepped increased releasing force.

It will be understood that each of the elements described above, or two or more together, may also find a useful application in other types of constructions differing from the types described above.

While the invention has been illustrated and described as embodied in method of bridging partial tightness on movable members, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

What is claimed is:

1. A method of bridging partial tightnesses of movable members which are received in guides and are driven by electric drive motors, comprising the steps of controlling drive motors with a monitoring function; providing an automatic monitoring function by automatically operating control; and varying a releasing force inside a tightness region in at least one step, wherein said automatically operating control includes a stepped increase of the releasing force by a first starting routine and a second starting routine, wherein the first starting routine results in a first clamping force increase upon encountering a tightness region, and wherein the second starting routine is performed with an increased value for a clamping force to be applied, wherein increase of the clamping force is restricted by a maximum clamping force to be exerted by the movable member on the tightness region, and wherein said monitoring function comprises a clamping parameter storage for storing forces encountered upon movement of the movable members in the first and second starting routines, wherein each of the first and second starting routines is provided with a test routine to detect a normal run or a clamping situation.

2. A method as defined in claim 1, wherein said varying includes varying the releasing force in a plurality of steps.

3. A method as defined in claim 1, wherein said automatically operating control includes increasing the releasing force at a position of the tightness region.

4. A method as defined in claim 1, wherein said automatically operating control includes changing a rotary speed of the movable member.

5. A method as defined in claim 1, wherein said automatically operating control includes providing a closing force limiting.

6. A method as defined in claim 1; and further comprising branding a monitoring for starting and aiming point, after which a predetermined time period is cast out or a rotary speed reverse of electrical drive is provided.

7. A method as defined in claim 4; and further comprising performing said first starting routine and said second starting routine so that when the releasing force is increased until it reaches a set maximum releasing force and a value which overcomes the tightness region is stored in an adaptive storage.

8. A method as defined in claim 1; and further comprising setting back the automatic bridging function when the member to be moved reaches a corresponding closing position.

9. A method as defined in claim 1; and further comprising setting back the automatic bridging function when a stoppage of an electrical drive exceeds a predetermined time period.

10. A method as defined in claim 1; and further comprising setting back the automatic bridging function when an opposite direction of an electrical drive is controlled.

* * * * *